United States Patent
Honjo et al.

(10) Patent No.: US 10,942,331 B2
(45) Date of Patent: Mar. 9, 2021

(54) CONTROL APPARATUS, LENS APPARATUS, PHOTOGRAPHIC APPARATUS, FLYING BODY, AND CONTROL METHOD

(71) Applicant: SZ DJI TECHNOLOGY CO., LTD., Shenzhen (CN)

(72) Inventors: Kenichi Honjo, Shenzhen (CN); Yoshinori Nagayama, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/727,386

(22) Filed: Dec. 26, 2019

(65) Prior Publication Data

US 2020/0132963 A1   Apr. 30, 2020

Related U.S. Application Data

(63) Continuation of application No. PCT/CN2018/111023, filed on Oct. 19, 2018.

(30) Foreign Application Priority Data

Oct. 30, 2017 (JP) .............................. JP2017-209170

(51) Int. Cl.
| G02B 7/09 | (2006.01) |
| G03B 13/36 | (2006.01) |
| G03B 15/00 | (2006.01) |
| H04N 5/225 | (2006.01) |

(52) U.S. Cl.
CPC .............. *G02B 7/09* (2013.01); *G03B 13/36* (2013.01); *G03B 15/006* (2013.01); *H04N 5/2254* (2013.01)

(58) Field of Classification Search
None
See application file for complete search history.

(56) References Cited

U.S. PATENT DOCUMENTS

| 3,754,828 A | * 8/1973 | Darvasi ................. G03B 13/18 |
| | | 356/8 |
| 2010/0066864 A1 | * 3/2010 | Abe ...................... H04N 5/2628 |
| | | 348/240.3 |
| 2013/0010177 A1 | 1/2013 | Choi |

(Continued)

FOREIGN PATENT DOCUMENTS

| CN | 103869442 A | 6/2014 |
| CN | 104503189 A | 4/2015 |

(Continued)

OTHER PUBLICATIONS

The World Intellectual Property Organization (WIPO) International Search Report for PCT/CN2018/111023 dated Jan. 21, 2019 7 Pages (including translation).

*Primary Examiner* — William B Perkey (74) *Attorney, Agent, or Firm* — Anova Law Group, PLLC (57) ABSTRACT

A control apparatus for controlling driving of a focus lens of a lens apparatus includes a memory storing a program and a processor. The processor is configured to execute the program to determine, according to a height of the lens apparatus from a reference position, a focus position of the focus lens indicating a position of the focus lens; and control the driving of the focus lens according to the focus position.

14 Claims, 6 Drawing Sheets

(56) References Cited

U.S. PATENT DOCUMENTS

| | | | |
|---|---|---|---|
| 2014/0028897 A1* | 1/2014 | Azuma | G03B 3/10 348/357 |
| 2015/0215522 A1 | 7/2015 | Ebisu | |
| 2017/0195549 A1 | 7/2017 | Cao et al. | |

FOREIGN PATENT DOCUMENTS

| | | |
|---|---|---|
| CN | 105611159 A | 5/2016 |
| CN | 106331438 A | 1/2017 |
| CN | 106791431 A | 5/2017 |
| CN | 107079102 A | 8/2017 |
| JP | 2006091252 A | 4/2006 |
| JP | 2015106840 A | 6/2015 |
| JP | 2015163943 A | 9/2015 |
| JP | 2015200737 A | 11/2015 |
| JP | 2016224096 A | 12/2016 |
| JP | 2017144986 A | 8/2017 |
| WO | 2017177465 A1 | 10/2017 |

* cited by examiner

CONTROL APPARATUS, LENS APPARATUS, PHOTOGRAPHIC APPARATUS, FLYING BODY, AND CONTROL METHOD

CROSS-REFERENCE TO RELATED APPLICATIONS

This application is a continuation of International Patent Application No. PCT/CN2018/111023, filed on Oct. 19, 2018, which claims priority to Japanese Patent Application No. 2017-209170, filed on Oct. 30, 2017, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to a control apparatus, a lens apparatus, a photographic apparatus, a flying body, a control method, and a program.

BACKGROUND

Japanese Patent Application Publication No. 2016-224096 discloses a lens apparatus that performs zoom-tracking control that causes a focus lens to move, so as to correct a focus shift accompanying movement of a zoom lens. However, when such lens apparatus is carried on a flying body that changes heights, more time is needed for the lens apparatus to maintain a focused state.

SUMMARY

In accordance with the disclosure, there is provided a control apparatus for controlling driving of a focus lens of a lens apparatus. The control apparatus includes a memory storing a program and a processor. The processor is configured to execute the program to determine, according to a height of the lens apparatus from a reference position, a focus position of the focus lens indicating a position of the focus lens; and control the driving of the focus lens according to the focus position.

Also in accordance with the disclosure, there is provided a control method for controlling driving of a focus lens of a lens apparatus. The control method includes determining a focus position indicating a position of the focus lens according to a height of the lens apparatus from a reference position; and controlling the driving of the focus lens according to the focus position.

REFERENCE NUMERALS

10, unmanned aerial vehicle (UAV); 20, UAV body; 30, UAV control unit; 32, memory; 36, communication Interface; 40, propulsion unit; 41, global positioning system (GPS) receiver; 42, inertial measurement unit (IMU); 43, magnetic compass; 44, barometric altimeter; 45, temperature sensor; 46, humidity sensor; 50, gimbal bracket; 60, photographic apparatus; 100, photographic apparatus; 102, photographing unit; 110 photographing-control unit; 120, image sensor; 130, memory; 200, lens unit; 210, lens; 212, lens-driving unit; 214, position sensor; 220, lens-control unit; 221, obtaining unit; 222, determining unit; 223, specifying unit; 224, focus-control unit; 225, zoom-control unit; 230, memory; 300 remote-operation apparatus; 1200, computer; 1210, host controller; 1212, central processing unit (CPU); 1214, random-access memory; 1220, input/output controller; 1222, communication interface; and 1230, read-only memory (ROM).

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments derived by those of ordinary skills in the art on the basis of the described embodiments without inventive efforts should fall within the scope of the present disclosure.

Exemplary embodiments will be described with reference to the accompanying drawings, in which the same reference numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Various embodiments of the present disclosure are described with reference to flowcharts and block diagrams. Blocks in the flowcharts and block diagrams may represent (1) a stage of a process of performing an operation or (2) a "unit" of an apparatus having a function of performing an operation. Specified stage and "unit" may be implemented by programmable circuits and/or processors. Dedicated circuits may include digital and/or analog hardware circuits. Dedicated circuits may include integrated circuits (ICs) and/or discrete circuits. Programmable circuits may include reconfigurable hardware circuits. Reconfigurable hardware circuits may include logical AND, logical OR, logical XOR, logical NAND, logical NOR, and other logical operations, flip-flops, registers, field programmable gate arrays (FPGAs), programmable logic arrays (PLAs), and other memory components, etc.

A computer-readable medium may include any tangible device that can store instructions executed by a suitable device. A computer-readable medium having instructions stored thereon may include a product including instructions that can be executed to create a means for performing the operations specified by the flowchart or block diagram. Examples of the computer-readable medium may include an electronic storage medium, a magnetic storage medium, an optical storage medium, an electromagnetic storage medium, a semiconductor storage medium, etc. More specific examples of a computer-readable medium may include a floppy disk (registered trademark), a magnetic floppy disk, a hard disk, a random-access memory (RAM), a read-only memory (ROM), an erasable programmable read-only memory (EPROM), flash memory, an electrically erasable programmable read-only memory (EEPROM), a static random-access memory (SRAM), a compact disc read-only memory (CD-ROM), a digital versatile disc (DVD), a Blu-ray® disc, a memory stick, an integrated circuit (IC) card, etc.

Computer-readable instructions may include any of source code or object code described by any combination of one or more programming languages. The source or object code may include procedural programming languages. The procedural programming languages may include assembly instructions, instruction-set-architecture (ISA) instructions, machine instructions, machine-related instructions, microcode, firmware instructions, state-setting data, or Smalltalk, JAVA (registered trademark), C++, other object-oriented programming languages, "C" programming languages, or the like. The computer-readable instructions may be provided to a processor or a programmable circuit of a general-purpose computer, a special-purpose computer, or other programmable data-processing device locally or via a local area network (LAN) or a wide area network (WAN) such as the Internet. The processor or programmable circuit can execute computer-readable instructions to create a means for performing the operations specified in the flowchart or block diagram. Examples of the processor may include a computer processor, a processing unit, a microprocessor, a digital signal processor, a controller, a microcontroller, and the like.

Figure 1:
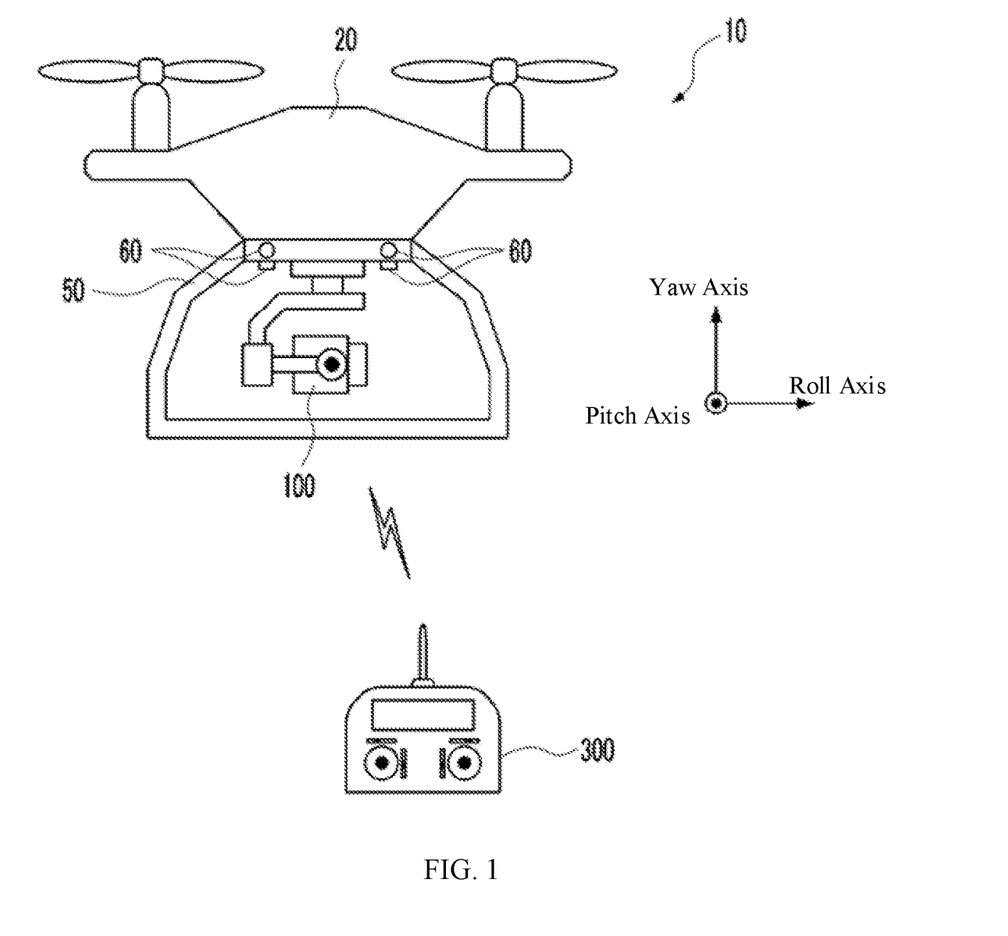
FIG. 1 illustrates schematic views of an unmanned aerial vehicle (UAV) and a remote-operation apparatus according to various embodiments of the present disclosure.

FIG. 1 illustrates schematic views of an unmanned aerial vehicle (UAV) 10 and a remote-operation apparatus 300 according to various embodiments of the present disclosure. The UAV 10 includes a UAV body 20, a gimbal bracket 50, a plurality of photographic apparatuses 60, and a photographic apparatus 100. The gimbal bracket 50 and the photographic apparatus 100 are an example of a photographing system. The UAV10 is an example of a flying body moving in the air. The flying body may include not only a UAV, but also other suitable aircraft, airships, and helicopters that move in the air, and the like.

The UAV body 20 includes a plurality of rotors. The plurality of rotors are an example of propulsion unit. The UAV body 20 controls rotations of the plurality of rotors to cause the UAV 10 to fly. The UAV body 20 may use, for example, four rotors to cause the UAV 10 to fly. The number of rotors is not limited to four. Further, the UAV10 may be, for example, a fixed-wing aircraft without rotors.

The photographic apparatus 100 may be, for example, a photographing camera that captures images of an object-to-be-photographed in a desired photographic range. The object-to-be-photographed is an object to be photographed or a photographed object. The gimbal bracket 50 may rotatably support the photographic apparatus 100. The gimbal bracket 50 is an example of a support structure. For example, the gimbal bracket 50 may use an actuator to rotatably support the photographic apparatus 100 around a pitch axis. The gimbal bracket 50 may further support the photographic apparatus 100 rotatably around a roll axis and a yaw axis using actuators, respectively. The gimbal bracket 50 can change an attitude of the photographic apparatus 100 by causing the photographic apparatus 100 to rotate around at least one of a yaw axis, a pitch axis, or a roll axis.

The plurality of photographic apparatuses 60 may be, for example, sensing cameras for photographing a surrounding environment of the UAV 10, so as to control flight of the UAV 10. Two photographic apparatuses 60 may be arranged on a nose of the UAV 10, i.e., on a front of the UAV 10. Further, other two photographic apparatuses 60 may be arranged on a bottom surface of the UAV 10. The two photographic apparatuses 60 on the front of the UAV 10 may be paired, so as to function as a stereo camera. The two photographic apparatuses 60 on the bottom surface may be paired, so as to function as a stereo camera. Three-dimensional space data around the UAV 10 may be generated according to images captured by the plurality of photographic apparatuses 60. The number of photographic apparatuses 60 included in the UAV 10 is not limited to four. The UAV 10 only needs to include at least one photographic apparatus 60. Further, the UAV 10 may include at least one photographic apparatus 60 separately on a nose, a tail, each side, a bottom, and a top of the UAV 10. A configurable angle of view (AOV) of the photographic apparatus 60 may be greater than a configurable angle of view of the photographic apparatus 100. The photographic apparatus 60 may include, for example, a single-focus lens or a fisheye lens.

The remote-operation apparatus 300 may communicate with the UAV 10 to remotely operate the UAV 10. The remote-operation apparatus 300 may perform wireless communication with the UAV 10. The remote-operation apparatus 300 may send the UAV 10 instruction information indicating various instructions relating to movements of the UAV 10 such as ascent, descent, acceleration, deceleration, forward, backward, rotation, etc. The instruction information may include, for example, instruction information for raising a height of the UAV 10. The instruction information may indicate, for example, a height at which the UAV 10 is to be located. Accordingly, the UAV 10 may move to the height indicated by the instruction information received from the remote-operation apparatus 300. The instruction information may include, for example, an ascent instruction to cause UAV10 to rise. The UAV10 may rise while receiving the ascent instructions. When the height of the UAV10 reaches an upper limit for the height, the UAV10 may limit the ascent even if the UAV10 receives the ascent instructions.

Figure 2:
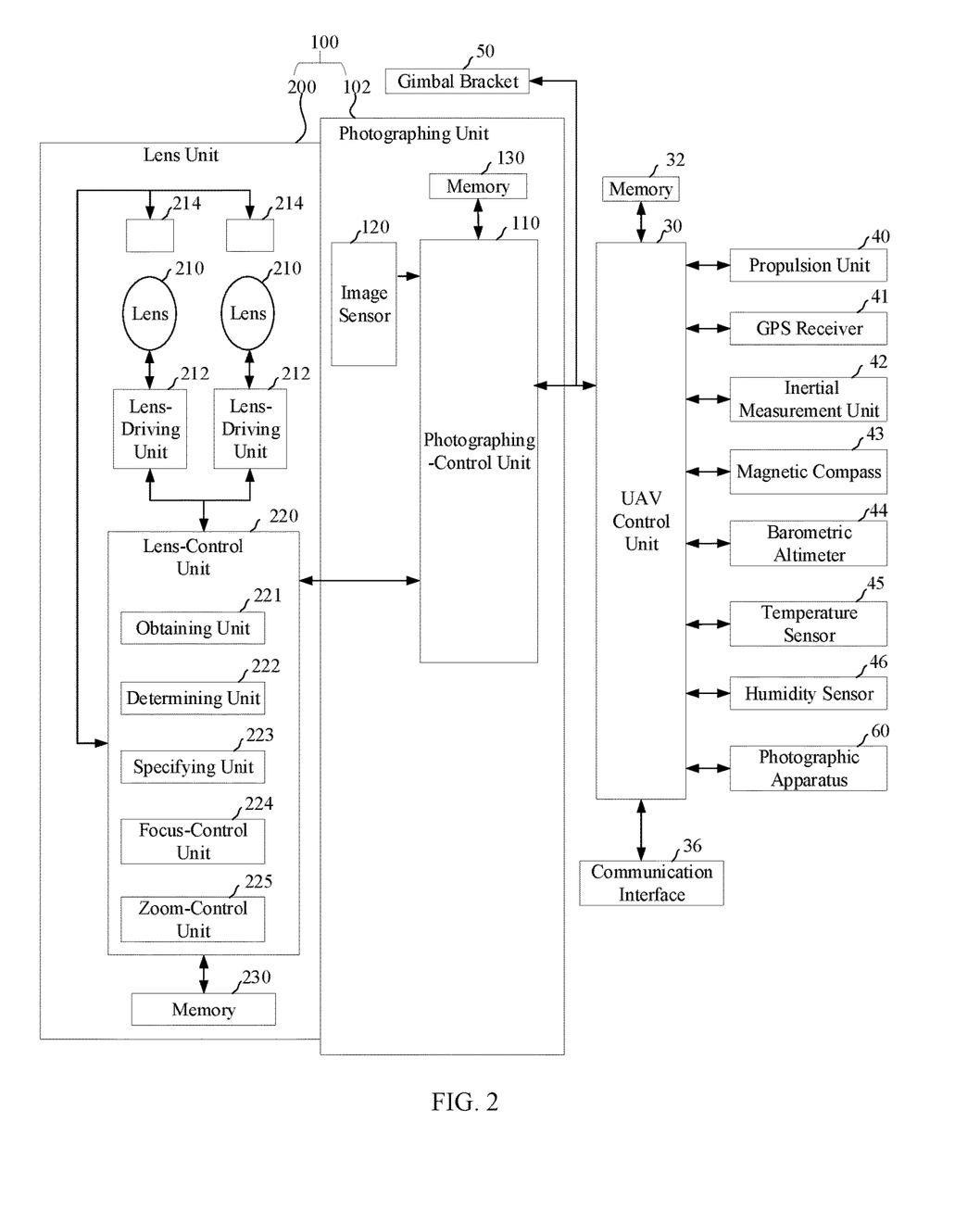
FIG. 2 illustrates exemplary functional components of a UAV according to various embodiments of the present disclosure.

FIG. 2 illustrates exemplary functional components of the UAV10 according to various embodiments of the present disclosure. The UAV10 includes a UAV control unit 30, a memory 32, a communication interface 36, a propulsion unit 40, a global positioning system (GPS) receiver 41, an inertial measurement apparatus (IMU) 42, a magnetic compass 43, a barometric altimeter 44, a temperature sensor 45, a humidity sensor 46, a gimbal bracket 50, a photographic apparatus 60, and a photographic apparatus 100.

The communication interface 36 may communicate with the remote-operation apparatus 300 or other suitable apparatuses. The communication interface 36 may receive, from the remote-operation apparatus 300, instruction information that includes various instructions to the UAV control unit 30. The memory 32 may store programs and the like required by the UAV control unit 30 for controlling the propulsion unit 40, the GPS receiver 41, the IMU 42, the magnetic compass 43, the barometric altimeter 44, the temperature sensor 45, the humidity sensor 46, the gimbal bracket 50, the photographic apparatus 60, and the photographic apparatus 100. The memory 32 may be a computer-readable recording medium, and may include at least one of a static random-access memory (SRAM), a dynamic random-access memory (DRAM), an erasable programmable read-only memory (EPROM), an electrically erasable programmable read-only memory (EEPROM), or a flash memory such as a universal serial bus (USB) memory. The memory 32 may be arranged in the UAV body 20. Further, the memory 32 may be detachable from the UAV body 20.

The UAV control unit 30 may control flight and photographing of the UAV 10 according to programs stored in the memory 32. The UAV control unit 30 may include a microprocessor such as a central processing unit (CPU) or a micro-processing unit (MPU), a microcontroller such as a microcontroller unit (MCU), etc. The UAV control unit 30 may control flight and photographing of the UAV 10 according to instructions received from the remote-operation apparatus 300 via the communication interface 36. The propulsion unit 40 may move the UAV 10. The propulsion unit 40 may include a plurality of rotors and a plurality of driving motors that cause the plurality of rotors to rotate. The propulsion unit 40 may, according to instructions from the UAV control unit 30, use the plurality of driving motors to cause the plurality of rotors to rotate, so as to cause the UAV 10 to fly.

The GPS receiver 41 may receive a plurality of signals indicating time and transmitted from a plurality of GPS satellites. The GPS receiver 41 may calculates a position (e.g., latitude and longitude) of the GPS receiver 41, which is a position (e.g., latitude and longitude) of the UAV 10, according to the plurality of received signals. The IMU 42 may detect the attitude of the UAV 10. The IMU 42 may detect accelerations in three-axis directions of front-to-back, left-to-right, and top-to-bottom and angular velocities in three-axis directions of pitch axis, roll axis, and yaw axis as an attitude of the UAV 10. The magnetic compass 43 may detect an orientation of the nose of the UAV 10. The barometric altimeter 44 may detect a flight altitude of the UAV 10. The barometric altimeter 44 may detect an air pressure around the UAV 10 and convert the detected air pressure into an altitude to detect the altitude. The temperature sensor 45 may detect a temperature around the UAV 10. The humidity sensor 46 may detect humidity around the UAV 10.

The photographic apparatus 100 may include a photographing unit 102 and a lens unit 200. The lens unit 200 is an example of a lens apparatus. The photographing unit 102 may include an image sensor 120, a photographing-control unit 110, and a memory 130. The image sensor 120 may include, for example, a charge-coupled device (CCD) or a complementary metal-oxide semiconductor (CMOS). The image sensor 120 may capture an optical image formed by a plurality of lenses 210, and output captured image data to the photographing-control unit 110. The photographing-control unit 110 may include, for example, a microprocessor such as a central-processing unit (CPU) or a micro-processing unit (MPU), a microcontroller such as a microcontroller unit (MCU), etc. The photographing-control unit 110 may control the photographic apparatus 100 according to motion instructions for the photographic apparatus 100 and from the UAV control unit 30. The memory 130 may be, for example, a computer-readable recording medium, and may include at least one of a SRAM, a DRAM, an EPROM, an EEPROM, or a flash memory such as a USB memory. The memory 130 may store programs or the like required by the photographing-control unit 110 for controlling the image sensor 120, etc. The memory 130 may be arranged in a housing of the photographic apparatus 100. The memory 130 may be detachable from the housing of the photographic apparatus 100.

The lens unit 200 includes a plurality of lenses 210, a plurality of lens-driving units 212, and a lens-control unit 220. The plurality of lenses 210 can function as a zoom lens, a varifocal lens, and a focus lens. At least part of or all of the plurality of lenses 210 may be configured to be movable along an optical axis. The lens unit 200 may be detachable from the photographing unit 102 for changing lenses. The lens-driving units 212 may move at least part of or all of the plurality of lenses 210 along an optical axis via a mechanism member such as a cam ring. The lens-driving unit 212 may include an actuator. The actuator may include a stepper motor. The lens-control unit 220 may drive the lens-driving unit 212 according to lens-control instructions from the photographing unit 102 to cause one or more lenses 210 to move along an optical-axis direction via a mechanism member. The lens-control instructions may be, for example, zoom-control instructions and/or focus-control instructions.

The lens unit 200 may further include a memory 230 and a position sensor 214. The lens-control unit 220 controls movement of the lenses 210 along the optical-axis direction via the lens-driving units 212 according to lens-motion instructions from the photographing unit 102. Part or all of the lens 210 may move along the optical-axis direction. The lens-control unit 220 may cause at least one of the lenses 210 to move along the optical axis, so as to perform at least one of a zooming operation or a focusing operation. The position sensors 214 may detect a position of the lens 210. The position sensors 214 may detect a current zoom position or a current focus position.

The lens-driving unit 212 may include a shake-correction mechanism. The lens-control unit 220 may perform a shake correction by using the shake-correction mechanism to cause the lenses 210 to move in a direction along the optical axis and/or a direction perpendicular to the optical axis. The lens-driving unit 212 may use a stepper motor to drive the shake-correction mechanism to perform the shake correction. Further, the shake-correction mechanism may be driven by a stepper motor to cause the image sensor 120 to move in a direction along the optical axis or in a direction perpendicular to the optical axis, so as to perform the shake correction.

The memory 230 may store control values of the plurality of lenses 210 that are moved by the lens-driving unit 212. The memory 230 may include at least one of a SRAM, a DRAM, an EPROM, an EEPROM, or a flash memory such as a USB memory.

A height of a photographic apparatus often changes as a UAV flies. When the photographic apparatus attempts to focus on a desired object-to-be-photographed by autofocus (AF), such as contrast AF, a distance from the photographic apparatus to the object-to-be-photographed may change due to a change in the height of the photographic apparatus, and thus it takes time to focus.

In the present disclosure, the photographic apparatus 100 may control a focus position of a focus lens according to a height of the photographic apparatus 100. As the height of the photographic apparatus 100 increases, the focus position of the focus lens may be changed, for example, from a nearest side to an infinity side. For example, when the UAV10 starts flying and further goes up, the focus position of the focus lens may be gradually changed from the nearest side to the infinity side. Accordingly, an extension of the time for focusing on a desired object-to-be-photographed due to a change in the height of the photographic apparatus 100 may be suppressed.

The lens-control unit 220 includes an obtaining unit 221, a determining unit 222, a specifying unit 223, a focus-control unit 224, and a zoom-control unit 225. The obtaining unit 221 may obtain height information indicating a height of the photographic apparatus 100 from the ground. UAV10 may include an infrared sensor that detects a distance from the ground. The infrared sensor may be, for example, arranged in the UAV10 and in a vertical-downward direction. The infrared sensor may, for example, radiate infrared light downward in an extending direction and receive reflected light, so as to detect a distance from the UAV10 to the ground. The obtaining unit 221 may obtain information of the distance from the UAV 10 to the ground detected by the infrared sensor, and the obtained information may be used as, for example, height information indicating a height of the photographic apparatus 100 from a reference position or a height of the lens unit 200 from the reference position. The reference position may be, for example, a position on a preset reference plane. Further, the reference position may be, for example, an intersection of a reference plane and a straight line extending in a vertical direction from the photographic apparatus 100 or the UAV 10. The reference position may be, for example, an intersection of a reference plane and a straight line extending in a vertical direction from a preset point, such as a center of gravity of the photographic apparatus 100 or UAV 10, etc. The reference plane may be, for example, a take-off surface of the UAV 10 such as the ground, a sea surface, a floor surface, a roof surface, etc., or a surface on which the object-to-be-photographed of the photographic apparatus 100 is located.

The determining unit 222 may determine a focus position indicating a position of the focus lens according to the height of the photographic apparatus 100 from the reference position. When the height of the photographic apparatus 100 from the reference position is a first height, the determining unit 222 may determine a first focus position for focusing on an object-to-be-photographed at a first distance from the photographic apparatus 100 as the focus position. When the height of the photographic apparatus 100 from the reference position is a second height that is higher than the first height, the determining unit 222 may determine a second focus position for focusing on an object-to-be-photographed at a second distance longer than the first distance from the photographic apparatus 100 as the focus position.

Figure 3:
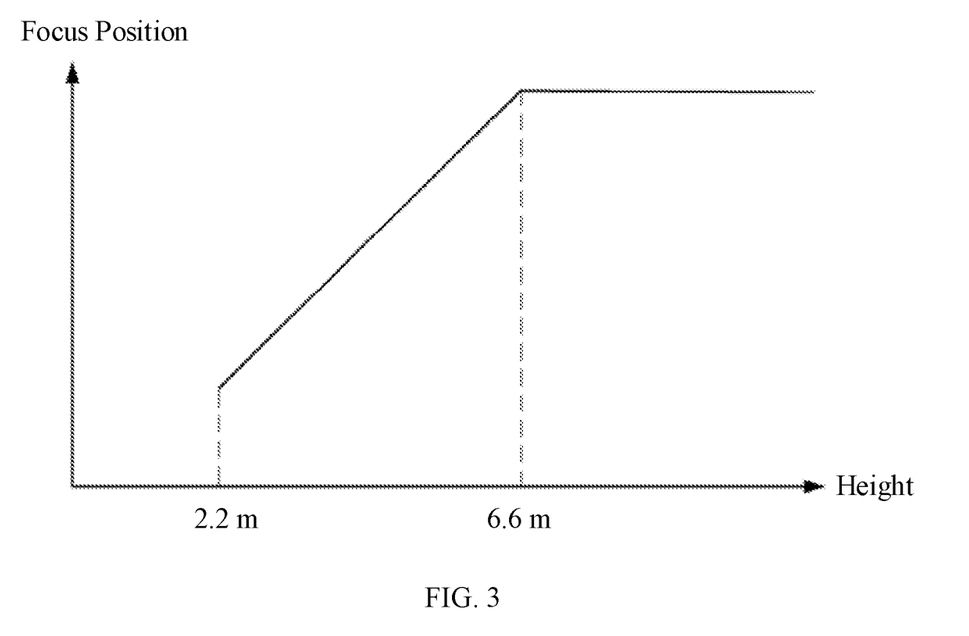
FIG. 3 illustrates an exemplary relationship between a height and a focus position of a photographic apparatus according to various embodiments of the present disclosure.

When the height of the photographic apparatus 100 from the reference position becomes more than a preset first height, the determining unit 222 may determine the focus position of the focus lens according to the height of the photographic apparatus 100, such that the focus position of the focus lens may change from the nearest side to the infinity side in stages until the height of the photographic apparatus 100 becomes a preset second height. For example, the determining unit 222 may determine the focus position of the focus lens corresponding to the height of the photographic apparatus 100 according to information indicating a relationship between the height of the photographic apparatus 100 and the focus position of the focus lens illustrated in FIG. 3. For example, when the height of the photographic apparatus 100 is greater than approximately 2.2 m, the determination unit 222 may determine the focus position of the focus lens, so as to gradually change the focus position of the focus lens from the nearest side toward the infinity side, until the height of the photographic apparatus 100 becomes approximately 6.0 m.

When the height of the photographic apparatus 100 from the reference position changes, the specifying unit 223 may specify a first change amount of the focus position of the focus lens to be changed according to the focus position determined by the determining unit 222. The focus-control unit 224 may control the driving of the focus lens according to the focus position determined by the determination unit 222. The focus-control unit 224 may control the driving of the focus lens, so as to change the position of the focus lens by, for example, the first change amount specified by the specifying unit 22. The focus-control unit 224 may control, in response to that a change amount of the height of the photographic apparatus 100 from the reference position becomes greater than a threshold value, the driving of the focus lens according to the focus position determined by the determining unit 222. When the change amount of the height of the photographic apparatus 100 from the reference position is greater than a threshold value and when the driving of the focus lens is controlled by autofocus such as contrast AF or the like, the focus-control unit 224 may temporarily interrupt the control of the driving of the focus lens by autofocus according to instructions from the photographing-control unit 110. Further, the focus-control unit 224 may control the driving of the focus lens according to the focus position determined by the determining unit 222. The focus control unit 224 may restart, in response to that the change amount of the height of the photographic apparatus 100 from the reference position becomes less than the threshold value, performing the control of the driving of the focus lens by auto-focus.

Figure 4:
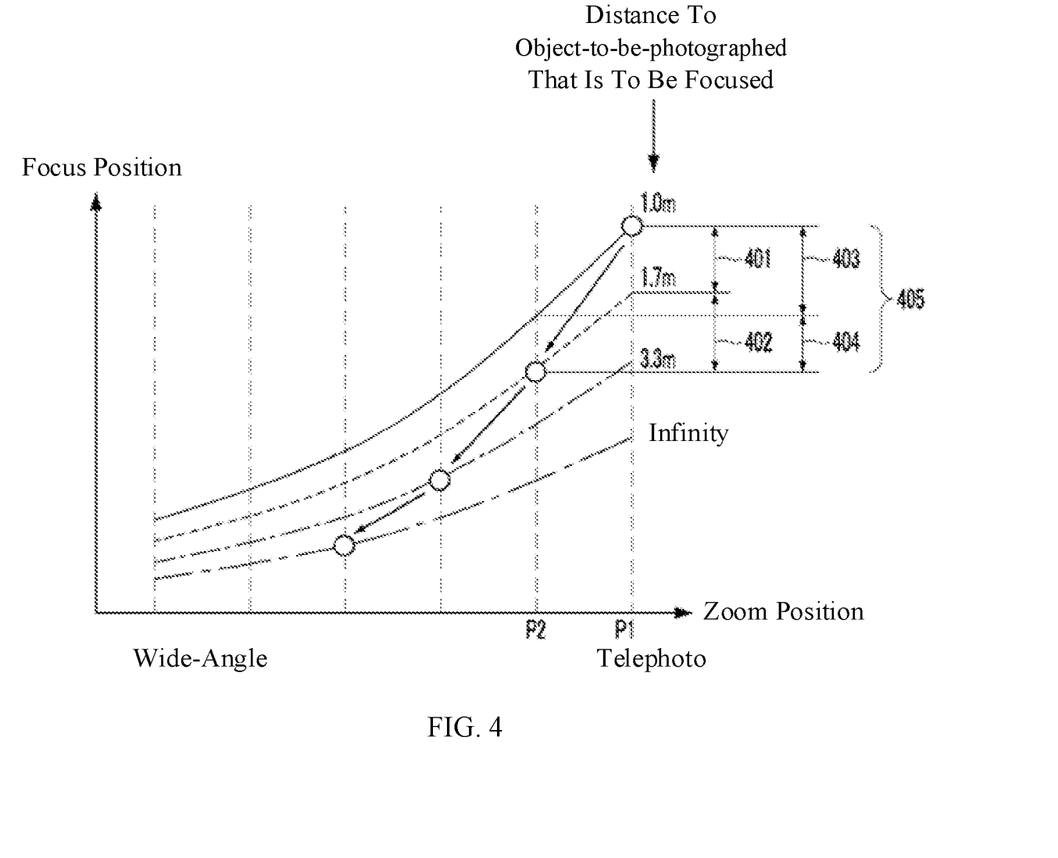
FIG. 4 illustrates an exemplary zoom-tracking curve according to various embodiments of the present disclosure.

The zoom-control unit 225 may control driving of the zoom lens according to zoom instructions from the photographing-control unit 110, so as to change a zoom position of the zoom lens. The photographic apparatus 100 may have a zoom-tracking function. The zoom-tracking function may be, for example, a function that changes the focus position that indicates the position of the focus lens according to a change of the zoom position, so as to keep an in-focus state of the object-to-be-photographed that is at an unchanged distance from the photographic apparatus 100, when the zoom position indicating a position of the zoom lens is changed. For example, zoom-tracking may be performed by moving the focus lens to a target focus position corresponding to a target zoom position specified according to a zoom-tracking curve illustrated in FIG. 4, and the zoom-tracking curve may correspond to a distance to a focused object-to-be-photographed. The zoom-tracking curve may be an example of information indicating the relationship between the focus position indicating the position of the focus lens and the zoom position indicating the position of the zoom lens. The position of the focus lens may be used to keep the in-focus state of the object-to-be-photographed that is at an unchanged distance from the photographic apparatus 100. The information may be determined by characteristics of an optical system of the lens unit 200, and may be stored in, for example, the memory 230.

The specifying unit 223 may specify a second change amount of the focus position indicating the position of the focus lens, and the second change amount may be used to keep the in-focus state of the object-to-be-photographed that is at an unchanged distance from the photographic apparatus 100, when the zoom position indicating the position of the zoom lens is changed. The specifying unit 223 may include, for example, a first specifying unit and/or a second specifying unit. When the zoom position indicating the position of the zoom lens is changed, the focus-control section 224 may control the driving of the focus lens according to the second change amount specified in the specifying unit 223, so as to perform zoom-tracking.

In certain cases, while the zoom position of the zoom lens of the photographic apparatus 100 is changed, the height of the photographic apparatus 100 may be changed. For example, there are cases in which the photographic apparatus 100 mounted on the UAV 10 is used to photograph landscapes. In such cases, right after the UAV 10 starts to fly, the zoom position is on a telephoto side; and as the UAV 10 rises, the zoom position gradually changes toward a wide-angle side and the photographic apparatus 100 may capture images at the same time. In such situations, it may take time to adjust the focus position of the focus lens during autofocus due to changes in the height of the photographic apparatus 100. Therefore, the focus-control unit 224 may adjust the focus position of the focus lens according to changes in the height of the photographic apparatus 100, and adjust the focus position of the focus lens according to changes in zoom position of the zoom lens, so as to control the driving of the focus lens.

When the height of the photographic apparatus 100 is changed during changes of the zoom position of the zoom lens, the focus-control unit 224 may control the driving of the focus lens during changes of the zoom position of the zoom lens, such that the focus position of the focus lens is changed by a total change amount of a first change amount according to the height change of the photographic apparatus 100 and a second change amount according to the change of the zoom position of the zoom lens, specified by the specifying unit 223. For example, referring to FIG. 4, during the change of the zoom position from P1 to P2, the height of the photographic apparatus 100 changes as the UAV 10 rises, such that the distance to the object-to-be-photographed to be focused is changed from approximately 1.0 m to approximately 1.7 m. Accordingly, in some embodiments, the focus-control unit 224 may control the driving of the focus lens, such that the focus position of the focus lens is changed by a change amount 405 that is the sum of a first change amount 401 according to the height change of the photographic apparatus 100 and a second change amount 402 according to the change of the zoom position of the zoom lens specified by the specifying unit 223. In some embodiments, the focus-control unit 224 may control the driving of the focus lens, such that the focus position of the focus lens is changed by a change amount 405 that is the sum of a second change amount 403 according to the change in the zoom position of the zoom lens and a first change amount 404 according to the height change of the photographic apparatus 100 specified by the specifying unit 223.

Figure 5:
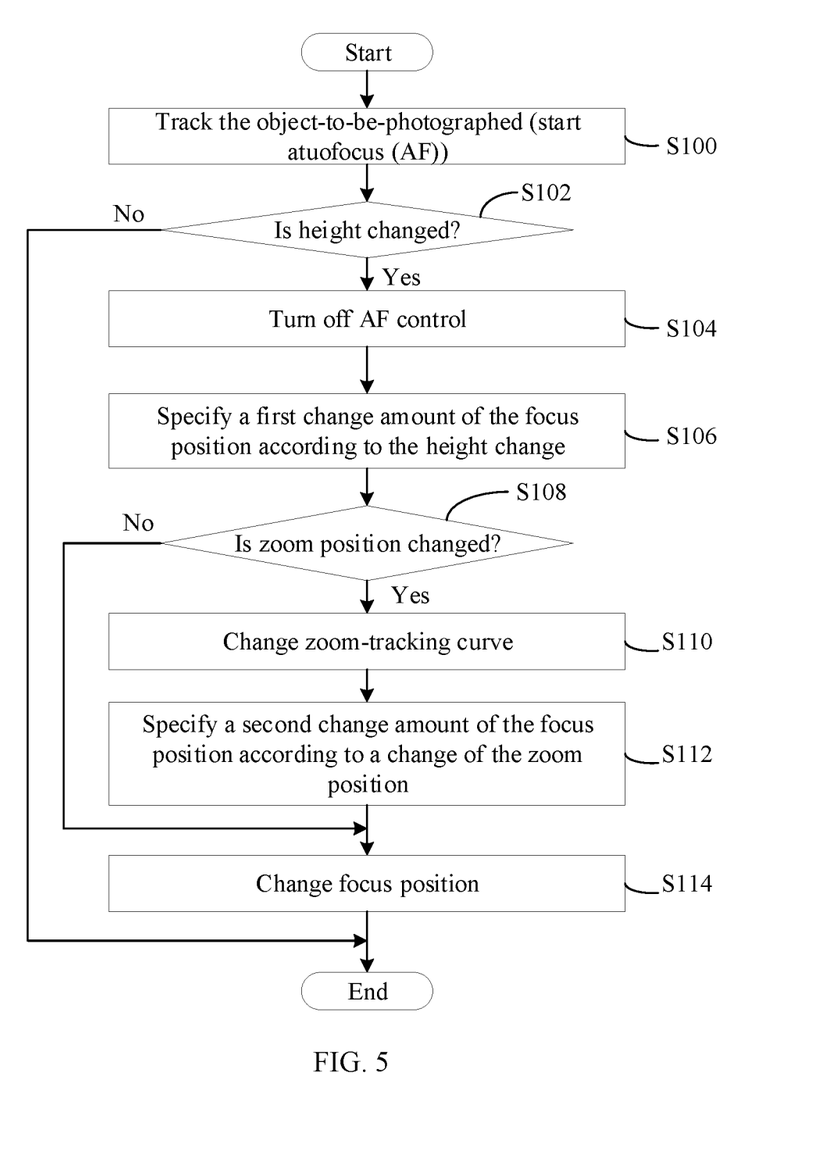
FIG. 5 illustrates a flowchart of an exemplary control process of a focus position according to various embodiments of the present disclosure.

FIG. 5 illustrates a flowchart of an exemplary control process of a focus position according to various embodiments of the present disclosure. The photographic apparatus 100 starts tracking the object-to-be-photographed. That is, the photographic apparatus 100 starts autofocus control (S100). The determining unit 222 determines whether the change amount of the height of the photographic apparatus 100, i.e., the height of the UAV 10, is greater than a preset change amount according to the height information of the photographic apparatus 100 obtained by the obtaining unit 221 (S102). The determining unit 222 can determine, according to the height information, whether the change amount of the height of the photographic apparatus 100 from the ground is greater than a preset change amount. If the height of the photographic apparatus 100 is changed, the photographic apparatus 100 interrupts the autofocus control (S104). Further, the determination unit 222 may determine the focus position of the focus lens corresponding to the height of the photographic apparatus 100 according to, for example, information indicating the relationship between the height of the photographic apparatus 100 and the focus position of the focus lens in FIG. 3, etc. Further, the specifying unit 223 specifies a first change amount of the focus position according to the current focus position of the focus lens and the determined focus position of the focus lens (S106). That is, the specifying unit 223 specifies a driving amount of the focus lens.

The specifying unit 223 determines whether the zoom position of the zoom lens is changed (S108). The specifying unit 223 may determine whether the zoom position is changed according to whether the lens-control unit 220 receives zoom instructions from the photographing-control unit 110. If the zoom position is changed, the specifying unit 223 may switch from the currently used zoom-tracking curve to a zoom-tracking curve corresponding to the focus position determined by the determining unit 222, so as to adjust the focus position of the focus lens that changes as the zoom position changes (S110). The specifying unit 223 specifies, according to the zoom-tracking curve that is switched to, a second change amount of the focus position of the focus lens that changes as the zoom position changes (S112). The focus-control unit 224 controls the driving of the focus lens to change the focus position of the focus lens (S114). If the zoom position is not changed, the focus-control unit 224 may, for example, control the driving of the focus lens, such that the focus position of the focus lens is changed by the first change amount. If there is a change in the zoom position in addition to the height change, the focus-control unit 224 may control the driving of the focus lens, such that the focus position of the focus lens is changed by a total change amount of the first change amount and the second change amount.

According to the present disclosure, the photographic apparatus 100 may suppress extension of the time for focusing on a desired object-to-be-photographed due to a change in the height of the photographic apparatus 100. For example, right after the UAV10 starts flying, the zoom position is on the telephoto side; and as the UAV10 rises, under the situations that the zoom position gradually changes to a wide-angle side and the photographic apparatus 100 captures images of landscapes or the like at the same time, extension of the time for focusing on a desired object-to-be-photographed due to a change in the height of the UAV 10 may be suppressed.

Figure 6:
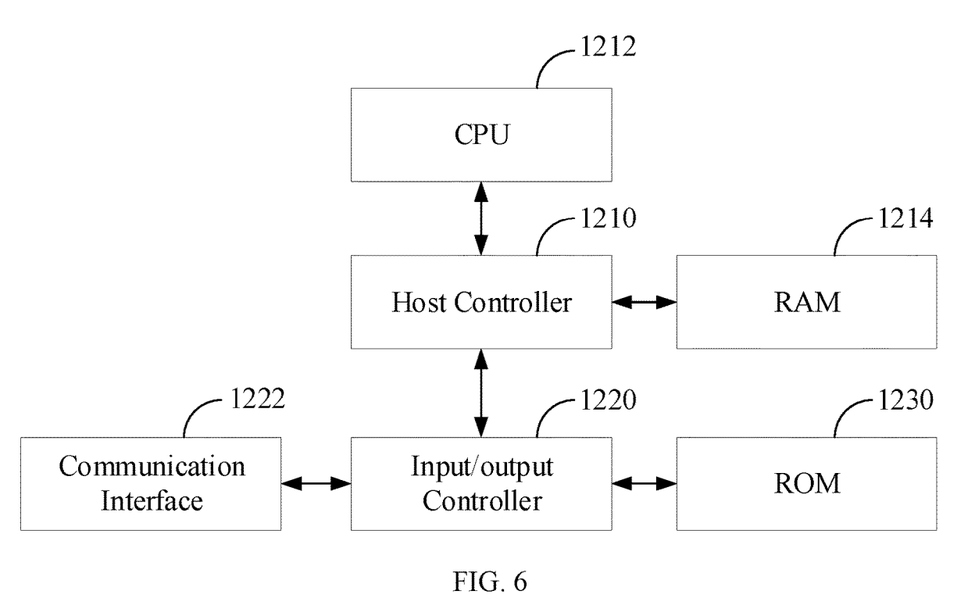
FIG. 6 illustrates exemplary hardware configurations according to various embodiments of the present disclosure.

FIG. 6 illustrates an exemplary computer 1200 consistent with various embodiments of the present disclosure. In some embodiments, programs installed on the computer 1200 may cause the computer 1200 to function for operations associated with apparatuses consistent with the present disclosure and/or function as one or more "parts" or "units" of the apparatuses. In some embodiments, the programs may cause the computer 1200 to perform the operations or to operate one or more "parts" or "units" of the apparatuses. In some embodiments, the programs may cause the computer 1200 to perform a process or a stage of the process consistent with the present disclosure. Such programs may be executed by a central processing unit (CPU) 1212 to cause the computer 1200 to perform operations associated with some or all of processes/blocks in the flowcharts and block diagrams described in the specification.

In some embodiments, the computer 1200 may include a CPU 1212 and a random-access memory (RAM) 1214, and the CPU 1212 and the RAM 1214 may be connected to each other via a host controller 1210. The computer 1200 may further include a communication interface 1222 and an input/output unit, and the communication interface 1222 and the input/output unit may be connected to the host controller 1210 via an input/output controller 1220. The computer 1200 may include a read-only memory ROM 1230. The CPU 1212 may operate according to programs stored in the ROM 1230 and the RAM 1214, so as to control each unit.

The communication interface 1222 may communicate with other electronic devices via a network. A hard-disk drive can store programs and data used by the CPU 1212 in the computer 1200. The ROM 1230 may store therein a boot program and the like executed by the computer 1200 at the time of operations, and/or programs that depend on hardware of the computer 1200. The programs may be provided via a computer-readable recording medium such as a compact disc read-only memory (CR-ROM), a universal serial bus (USB) memory, or an integrated circuit (IC) card, or via a network. The program may be installed in the RAM 1214 or the ROM 1230 which are examples of a computer-readable recording medium, and may be executed by the CPU 1212. The information processing described in the programs may be read by the computer 1200 to cause the cooperation between the programs and the above-mentioned various types of hardware resources. The apparatus or method can be configured according to information operations or processing that can be achieved by using the computer 1200.

For example, when the computer 1200 performs communication with an external device, the CPU 1212 may execute a communication program loaded in the RAM 1214 and instruct the communication interface 1222 to perform communication processing according to processing described in the communication program. The communication interface 1222 may read to-send data stored in a sending buffer in a recording medium such as the RAM 1214, the USB memory, or the like under control of the CPU 1212, and send the read to-send data to the network; and further, the communication interface 1222 may write received data that is received from the network in a receiving buffer or the like in the recording medium. The to-send data is data that is sent or to be sent.

Further, the CPU 1212 may cause the RAM 1214 to read all or required portions of a file or database stored in an external recording medium such as a USB memory, and perform various types of processing on data on the RAM 1214. Further, the CPU 1212 may write processed data back to the external recording medium.

Various types of information such as various types of programs, data, tables, and databases may be stored in a recording medium and subjected to information processing. For the data read from the RAM 1214, the CPU 1212 may perform various types of processing described in the present disclosure, including various types of operations, information processing, condition judgment, conditional transfer, unconditional transfer, information retrieval/replacement, etc., specified by instruction sequences of the programs, and may write results back to the RAM 1214. Further, the CPU 1212 can retrieve information in a file, a database, and the like in the recording medium. For example, when a plurality of entries having attribute values of the first attribute respectively associated with attribute values of the second attribute are stored in the recording medium, the CPU 1212 may retrieve, from the plurality of entries, an entry that matches a specified condition for an attribute value of the first attribute, and read the attribute value of the second attribute stored in the entry, so as to obtain the attribute value of the second attribute associated with the first attribute that satisfies a preset condition.

The programs or software modules described above may be stored on the computer 1200 or a computer-readable storage medium near the computer 1200. Further, a recording medium such as a hard disk or a RAM in a server system connected to a dedicated communication network or the Internet can be used as a computer-readable storage medium to provide the programs to the computer 1200 via the network.

It should be understood that, although the various processes of the methods of the present disclosure may be described in particular orders, it does not require or imply that the processes need be performed in the specific orders or that all the processes shown need to be performed in order to achieve the desired results. Additionally or alternatively, certain processes may be omitted, multiple processes may be combined into one process for execution, and/or one process may be divided into multiple processes for execution, etc.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physical unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random-access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A control apparatus for controlling driving of a focus lens of a lens apparatus, comprising:
   a memory storing a program; and
   a processor configured to execute the program to:
      determine, according to a height of the lens apparatus from a reference position, a focus position of the focus lens indicating a position of the focus lens;
      in response to a change amount of the height of the lens apparatus from the reference position becoming greater than a threshold value and the driving of the focus being controlled by autofocus, interrupt controlling the driving of the focus lens by autofocus and control the driving of the focus lens according to the focus position; and
      in response to the change amount of the height of the lens apparatus from the reference position becoming less than the threshold value, restarting controlling the driving of the focus lens by autofocus.

2. The control apparatus according to claim 1, wherein:
   when the height of the lens apparatus from the reference position is a first height, the processor is configured to execute the program to determine a first focus position, for focusing on an object-to-be-photographed at a first distance from the lens apparatus, as the focus position; and
   when the height of the lens apparatus from the reference position is a second height that is higher than the first height, the processor is configured to execute the program to determine a second focus position, for focusing on the object-to-be-photographed at a second distance from the lens apparatus and longer than the first distance, as the focus position.

3. The control apparatus according to claim 1, wherein the processor is further configured to execute the program to:
   specify a first change amount of the focus position of the focus lens changed by the processor according to the focus position determined by the processor, when the height of the lens apparatus from the reference position is changed, and
   control the driving of the focus lens to cause the position of the focus lens to change by the first change amount.

4. The control apparatus according to claim 3, wherein:
   the processor is further configured to execute the program to specify a second change amount of the focus position, when a zoom position indicating a position of a zoom lens of the lens apparatus is changed, wherein the second change amount is used to keep an in-focus state of the object-to-be-photographed that is at an unchanged distance from the lens apparatus, and
   in response to that the height of the lens apparatus is changed during a change in the zoom position of the zoom lens, the processor is configured to execute the program to control the driving of the focus lens to change the focus position of the focus lens by a total change amount of the first change amount and the second change amount during the change in the zoom position of the zoom lens.

5. The control apparatus according to claim 1, wherein:
   the control apparatus further controls driving of a zoom lens of the lens apparatus.

6. The control apparatus according to claim 5, wherein:
   the memory stores a zoom-tracking curve which indicates a relationship between the focus position and a zoom position indicating a position of the zoom lens.

7. The control apparatus according to claim 6, wherein:
   the processor is configured to execute the program to determine the focus position based on the zoom-tracking curve and the height of the lens apparatus from the reference position.

8. The control apparatus according to claim 7, wherein:
   the processor is configured to execute the program to change the zoom-tracking curve based on the height of the lens apparatus from the reference position.

9. A lens apparatus comprising the control apparatus according to claim 1, further including:
   a focus lens.

10. A photographic apparatus comprising the lens apparatus according to claim 9, further including:
    an image sensor that captures an optical image formed by the lens apparatus.

11. A flying body comprising the photographic apparatus according to claim 10, wherein:
    the flying body flies with the photographic apparatus.

12. A control method for controlling driving of a focus lens of a lens apparatus, comprising:
    determining a focus position indicating a position of the focus lens according to a height of the lens apparatus from a reference position;
    in response to a change amount of the height of the lens apparatus from the reference position becoming greater than a threshold value and the driving of the focus being controlled by autofocus, interrupt controlling the driving of the focus lens by autofocus and controlling the driving of the focus lens according to the focus position; and
    in response to the change amount of the height of the lens apparatus from the reference position becoming less than the threshold value, restarting controlling the driving of the focus lens by autofocus.

13. The control method according to claim 12, wherein determining the focus position includes:
    when the height of the lens apparatus from the reference position is a first height, determining a first focus position, for focusing on an object-to-be-photographed at a first distance from the lens apparatus, as the focus position; and
    when the height of the lens apparatus from the reference position is a second height that is higher than the first height, determining a second focus position, for focusing on the object-to-be-photographed at a second distance from the lens apparatus and longer than the first distance, as the focus position.

14. The control method according to claim 12, wherein the determining the focus position includes:
   determining the focus position based on a zoom-tracking curve, indicating a relationship between the focus position and a zoom position indicating a position of a zoom lens, and the height of the lens apparatus from the reference position.

* * * * *